United States Patent [19]
Sugiura

[11] 3,784,179
[45] Jan. 8, 1974

[54] CUSHIONING DEVICE
[75] Inventor: Toshihiro Sugiura, Toyota, Japan
[73] Assignee: Aisin Seiki Kabushiki Kaisha, Kariya City, Japan
[22] Filed: May 11, 1972
[21] Appl. No.: 252,251

[30] Foreign Application Priority Data
May 14, 1971 Japan ............................... 46/39278
June 25, 1971 Japan ............................... 46/55499

[52] U.S. Cl. .................... 267/35, 188/268, 188/284, 188/298, 188/315
[51] Int. Cl. ............................................ B60g 11/62
[58] Field of Search .................... 188/284, 298, 314, 188/315, 322, 268; 267/35

[56] References Cited
UNITED STATES PATENTS
| | | | |
|---|---|---|---|
| 2,038,032 | 4/1936 | Flynn | 188/314 x |
| 2,856,035 | 10/1958 | Rohacs | 188/298 x |
| 2,867,298 | 1/1959 | Roder | 188/314 x |

FOREIGN PATENTS OR APPLICATIONS
558,985  1/1944  Great Britain ...................... 188/284

*Primary Examiner*—George E. A. Halvosa
*Attorney*—Norman F. Oblon et al.

[57] ABSTRACT

A cushioning device including a closed cylindrical chamber, floating piston means within the chamber to divide the same into first and second axially arranged chamber sections, liquid filling the first chamber section and a compressible solid, such as silicone rubber, filling the second chamber section, a piston rod entering from outside the chamber and extending through the second chamber section and into the first chamber section, and a piston head on the inner end of the piston having axial orifice means therein, whereby the energy of buff forces applied to the piston rod is dissipated as a result of both a throttling effect produced by the liquid and a volume-pressure change undergone by the compressible solid.

5 Claims, 4 Drawing Figures

PATENTED JAN 8 1974

CUSHIONING DEVICE

BACKGROUND OF THE INVENTION

This invention relates generally to cushioning devices and more particularly to an apparatus and method for obtaining a damping action by utilizing compressible solids in combination with liquids.

It has been known in the art to utilize liquids and compressible solids separately or individually as the damping or working mediums in cushioning devices. The present invention contemplates the use of compressible solids in combination with liquids in a cushioning device to afford a larger dissipation of the energy of buff forces than is presently achieved by the conventional cushioning devices in which liquids or compressible solids are respectively solely used as the working or damping medium.

SUMMARY OF THE INVENTION

Accordingly, it is an object of the present invention to provide a cushioning device in which both the throttling effect produced by a liquid and the volume-pressure change of a compressible solid effectively cooperate to serve in dissipating the energy of buff forces.

Another object of the present invention is to provide a cushioning device in which increasing throttling effect can be provided in proportion to an increase of buff forces.

Still another object of the present invention is to provide a cushioning device in which a compressible solid balances with a piston rod as to reduction of increase in volume during operation within the chamber of such a device.

Still another object of the invention is to provide a cushioning device of very simple construction in which sealing required only to prevent extrusion of the compressible solid also can prevent any leakage problem encountered with liquid, so that certain structural advantages over the use of a liquid are provided in design.

To accomplish these and other objects, the cushioning device of the present invention comprises a closed chamber, a floating piston means to divide the chamber into first and second sections, liquid filling the first chamber section, a compressible solid filling the second chamber section, stopper means within the first chamber section limiting movement of the floating piston means toward the first chamber section so that the compressible solid is maintained under initial compression, a piston rod entering from outside the chamber through the second chamber section into the first chamber section, and a piston head fast at the inner end of the piston rod and providing axial orifice means. The piston rod is movable into the chamber in response to buff forces whereupon the liquid is forced through the orifice means and the compressible solid is compressed due to an increase in net volume of a part of the piston rod within the first chamber section, whereby the energy of buff forces is dissipated as a result of both a throttling effect produced by the liquid and the volume-pressure change of the compressible solid.

BRIEF DESCRIPTION OF THE DRAWING

Various other objects, features and attendant advantages of the present invention will be more fully appreciated as the same becomes better understood from the following description when considered in connection with the accompanying drawings in which like reference characters designate like or corresponding parts throughout the several FIGURES and wherein.

DESCRIPTION OF THE PREFERRED EMBODIMENTS

Figure 1:
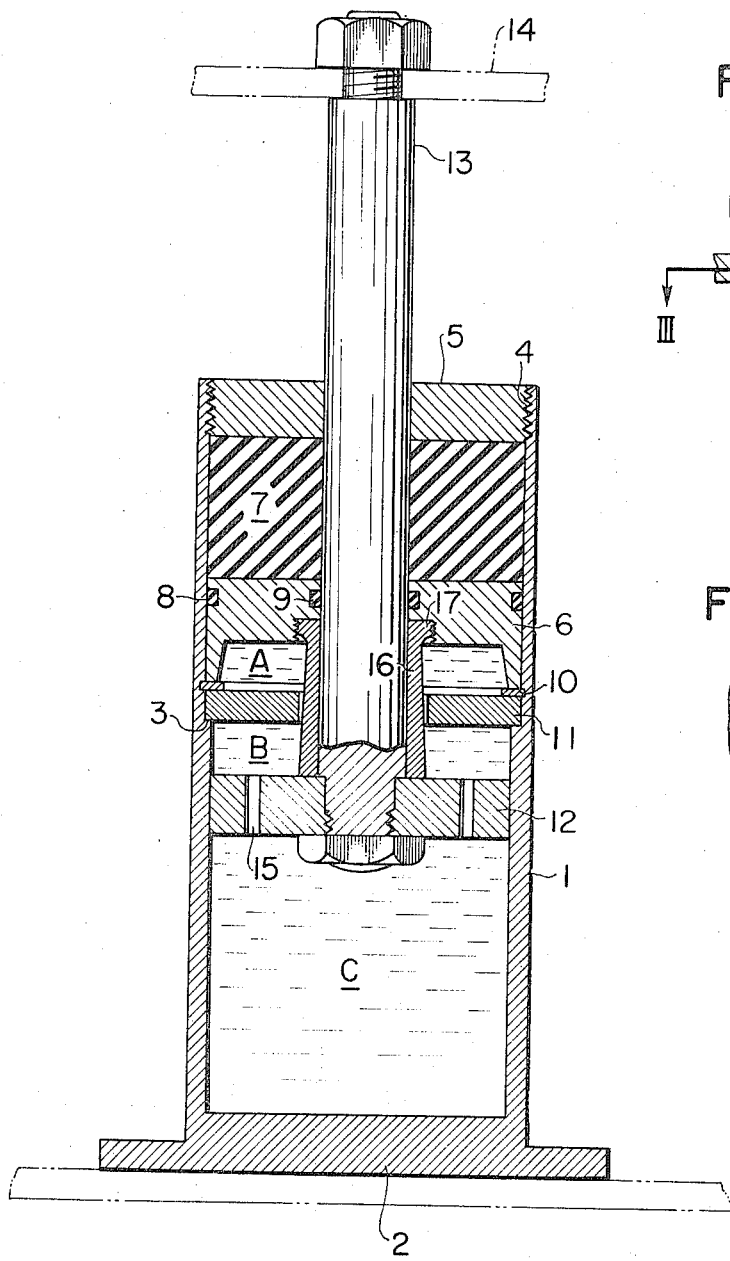
FIG. 1 is a lengthwise median sectional view of one embodiment of a cushioning device constructed according to the present invention.

Referring now to FIG. 1, there is shown one embodiment of a cushioning device of the present invention comprising a casing 1 having a closed rear end wall 2 and a hollow cylindrical interior of stepped diameter whereby an annular shoulder 3 is defined. The open or forward end of the casing is provided with internal threads 4 on which an annular end or cap member 5 is threadingly secured. The casing 1 and the cap member 5 serve as casing means.

Arranged within the casing 1, adjacent the forward end thereof, is a cushioning assembly consisting of an annular, axially slidable, floating piston member 6 and a compressible solid or elastomer 7, such as silicone rubber, which is disposed between the piston 6 and the cap member 5. Mounted within the piston member 6 are an outer seal ring 8 disposed in an annular groove in the piston that engages the adjacent inner peripheral wall of the casing 1 and an inner seal ring 9 embedded within a corresponding groove formed in the inner wall portion of the piston member. The compressible solid 7 normally biases the piston member 6 axially inwardly of the casing 1, or toward the rear end thereof, while its inward movement is limited by a snap ring 10 engaging a corresponding annular groove formed in the inner peripheral surface of the casing 1. The cap member 5 adjustably maintains the compressible solid 7 under initial compression to preload the solid 7. Intermediate the snap ring 10 and the shoulder 3 is disposed an orifice-defining member 11. In addition, the piston member 6 and the orifice member 11 define a chamber section A with the interior cylindrical surface of the casing 1. The orifice member 11 also defines another chamber section B with a piston head 12 fixedly secured on a piston rod 13 at the inner end thereof, as through threaded engagement therewith, and the interior cylindrical surface of the casing 1. The piston head 12 in turn defines further another or rear chamber section C with the interior cylindrical surface of the casing 1 and the end wall 2.

Extending through the cap member 5, the compressible solid 7, the piston member 6, and the orifice member 11, and into the chamber section C is the piston rod 13. A central hole of the cap member 5 slidably guides the piston rod 13, while the seal ring 9 provides a seal about the piston rod. The sealing effect of the compressible solid 7 is required only to prevent extrusion of the solid. The outer end of the piston rod 13 is preferably provided with a follower plate 14, as shown in dot and dash lines in the view. The plate is adapted to receive both buff and draft forces, or such forces directed towards driving the piston rod 13 inward or drawing it outward of the casing 1. A conical sleeve 16 is slidable on the piston rod 13 while the outer periphery of the sleeve is spaced throughout its length from the interior surface of the orifice member 11. The upper or top end of the sleeve 16 is formed with a flanged portion 17 which serves as the connection means thereof with the floating piston member 6, and may be threaded for making such connection. In addition, the chamber sections A, B and C are all filled with liquid, such as, for example, oil. It will be noted that the chamber sections A and B are interconnected to each other through the annular orifice provided by the sleeve 16 and the central hole of the orifice member 11 while chamber sections B and C are interconnected to each other through orifices 15 in the piston head 12.

When the cushioning device of the embodiment is inactive or at rest, the movable components thereof assume the positions shown in FIG. 1.

In operation, buff forces imposed on the follower plate 14, cause the piston rod 13 and the piston head 12 to move inwardly of the casing 1. During such movement the piston head 12 is forced into the chamber section C, whereupon the oil therein is caused to flow through the orifices 15 of the piston head 12 from the chamber section C to the chamber section B. Initially, such flowing of the liquid produces a throttling effect while causing pressure to be built-up in the liquid in the chamber section C, thereby providing a corresponding resistance to the buff forces. As a result, the energy of the buff forces is partially dissipated by the throttling effect. As the piston rod enters into the casing, the pressure of the liquid within the casing increases in proportion to the net increase in volume of the portion of the piston rod entering or being inside the casing. Such increase of the pressure within the casing causes a reduction in volume of the compressible solid 7 by compressing the same through the piston 6, and this reduction in turn causes flow of liquid through the annular orifice surrounding the conical sleeve 16 from the chamber section B to the chamber section A. A further throttling effect is produced by the flow of liquid through this annular orifice, and a corresponding resistance to the buff forces also results therefrom. The energy of the buff forces is thus further partially dissipated by such throttling effect. Still further, the volume-pressure change of the compressible solid 7 otherwise serves to dissipate the energy of the buff forces. It will be noted that when an increase in volume of the piston rod within the chamber section C takes place, the floating piston 6 moves upwardly to compress the compressible solid and the conical sleeve 16 moves with the piston 6 as a substantially integral portion thereof. The annular orifice surrounding the conical sleeve gradually reduces its substantial cross-sectional area as the sleeve upwardly moves so that the greater the movement the greater will be the throttling effect afforded thereby.

When the buff forces are fully dissipated, or removed from the follower plate 14, the pressure of the compressible solid 7 causes the piston rod 13 to return with the piston 12 to the position shown in the view. During the return stroke of the piston rod 13, the liquid within the section A flows back through the annular orifice surrounding the sleeve to fill the space within the casing being vacated by the piston rod 13, until the piston 6 abuts against the ring 10.

In accordance with the foregoing operation, the following advantages are achieved:

a. A larger dissipation of the energy of buff forces can be achieved due to the two-fold throttling effects respectively produced by the liquid and the volume-pressure change of the compressible solid;

b. An increasing throttling effect can be produced in proportion to the increase of buff forces so that the greater the buff forces the greater will be the dissipation thereof;

c. The compressible solid properly smoothly balances the piston rod as to reduction or increase in volume in the chamber during operation; and d. The use of a compressible solid at the open or forward end of the casing 1 provides certain structural advantages over the sole use of liquid in the device, in that sealing required only to prevent extrusion of the compressible solid also can prevent the leakage problem encountered with liquid.

Figure 2:
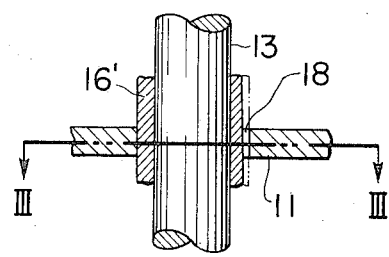
FIG. 2 is a lengthwise median sectional view of a modification of a sleeve in the embodiment of FIG. 1.
Figure 3:
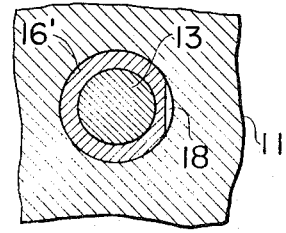
FIG. 3 is a sectional view of the sleeve of FIG. 2 taken along the line III-III in FIG. 2.

In FIGS. 2 and 3, there is shown a modification of the sleeve 16 of the embodiment illustrated in FIG. 1, being indicated by the reference numeral 16'. The sleeve 16' is cylindrical rather than conical and is provided with an axially scraped flat plane portion 18 on its external surface which is slightly inclined relative to the axis of the piston rod. The same throttling effect can thus be obtained as in the embodiment in FIG. 1.

Figure 4:
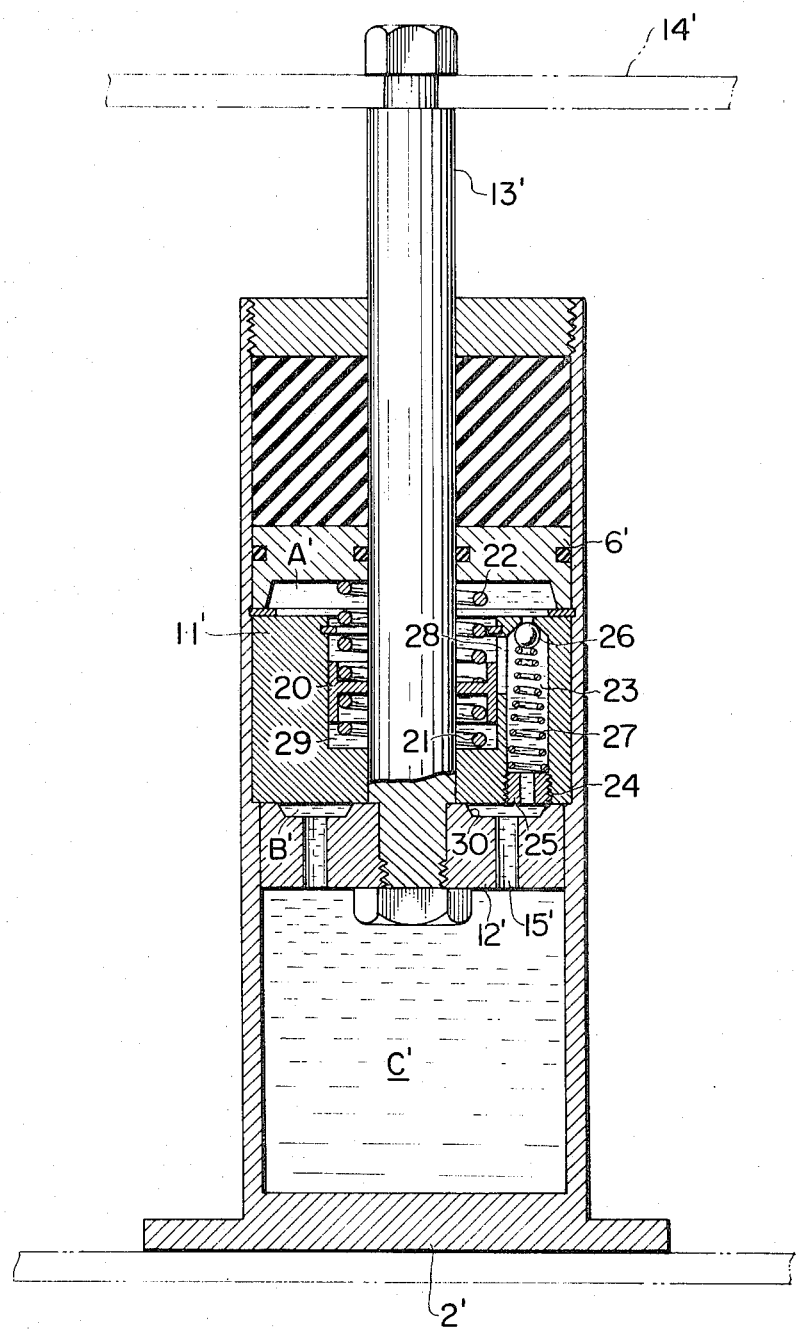
FIG. 4 is a lengthwise median sectional view of a second embodiment of a cushioning device constructed according to the present invention.

A second embodiment of the cushioning device of this invention is shown in FIG. 4, wherein primed reference numerals have been used to indicate components that are the same or similar to components identified in FIG. 1. In the cushioning device in FIG. 4, the orifice member 11' is of cup-like shape and of larger height or axial length than the orifice member 11 of the device in FIG. 1. A central hole in the bottom of the orifice member 11' slidably guides the piston rod 13'. Arranged within the orifice member 11' is an axially slidable ring-shaped floating valve member 20 normally located at a neutral position by two equally balanced force springs 21 and 22. The lower or rear end of the compressed spring 21 is received in the bottom of the orifice member 11' while the upper or forward end of the other compressed spring 22 is disposed against the lower edge of the floating piston 6'. When the floating pistion moves upwardly to its active position, the neutral position also moves upwardly to a new neutral position. When the cushioning device is inactive or at rest, the movable components thereof assume the position shown in FIG. 4. Such upward movement of the neutral position causes the valve member to move upwardly until the two spring forces balance each other, thus resulting in an increase of the throttling effect as hereinafter will be more fully explained. There is provided in the orifice member 11' a bore 23, the open lower end of which is internally threaded as at 24 for threadably receiving an annular spring retainer 25. The opposite upper open end of the bore 23 is formed into a valve seat so as to provide check valve means in cooperation with a ball 26 normally urged into engagement with the seat by a compressed spring 27 within bore 23 interposed between the ball 26 and the spring retainer 25. A hole 28 interconnects the inner space 29 of the orifice member and the bore 23. An annular recess is formed in the upper surface of the piston 12' and the orifices 15' are positioned along the recess, while the spring retainer 25 opens into the recess so that the section C' is interconnected with the section A' across the section B' when the device is at rest as shown in the view.

When the piston rod moves into the casing, the hole or orifice 28, owing to the aforementioned transfer of the valve member 20, reduces its cross-sectional area in inverse proportion to the inward movement of the piston rod, so that the greater the distance of the inward movement of the piston rod, the greater will be the throttling effect of the orifice or hole 28. The same advantages as the annular orifice of the embodiment in FIG. 1 are thus achieved. It will be noted that the cushioning device in FIG. 4 functions in the same manner as the device in FIG. 1 in both buff and draft, and offers the same features and advantages as the device in FIG. 1.

It will be understood that the check valve means formed by the ball 26 and its seat can provide means to quickly return the piston rod to its inactive position when the buff load is released.

While such embodiments as believed to be preferred, have been shown and described, it will be obvious to those skilled in the art that various rearrangements and modifications are possible in light of these teachings. It is to be understood therefore that within the scope of the appended claims, the present invention may be practiced otherwise than as specifically described herein. Accordingly.

What is claimed as new and desired to be secured by letters patent of the United States is:

1. A cushioning device comprising:
   a closed chamber;
   floating piston means disposed within the chamber to divide said chamber into first and second sections;
   liquid filling the first chamber section;
   a compressible solid filling the second chamber section;
   stopper means within the first chamber section limiting movement of the floating means toward the first chamber section so that said compressible solid is maintained under an initial compression;
   a piston rod entering from outside the chamber, extending through the second chamber section and into the first chamber section;
   a piston head secured to the inner end of the piston rod and providing axial orifice means, the piston rod being movable into the chamber in response to buff forces whereupon the liquid is forced through said orifice means and a compressible solid is compressed due to an increase in the net volume of the part of the piston rod being disposed within the first chamber section; and
   further orifice means provided between the piston head and the floating piston means within the first chamber section and subdividing the section, said further orifice means including an orifice of variable cross-sectional area being in proportion to movement of the floating piston means, so that the energy of said buff forces is dissipated as a result of both a throttling effect produced by the liquid and the volume-pressure chamber change of the compressible solid, and that an increasing throttling effect can be produced in proportion to the increase of said buff forces.

2. The cushioning device of claim 1, said further orifice means comprising:
   an orifice-defining member stationary within said first chamber section
   a conical sleeve freely slidable on said piston rod and integrally connected with said floating piston means, said orifice-defining member being an annular member through the central hole of which said conical sleeve passes with its periphery spaced from the interior surface of said central hole whereby said orifice of variable cross-sectional area is provided being in proportion to movement of the floating piston means.

3. The cushioning device of claim 1, said further orifice means comprising:
   an orifice-defining member stationary within said first chamber section and subdividing the section; and
   a cylindrical sleeve integrally connected with said floating piston means to slide therewith on said piston rod and provided with at least one axially scraped-off flat portion on its external surface inclined relative to the axis of said piston rod, said orifice-defining member being an annular member through the central hole of which passes said cylindrical sleeve, whereby said orifice of variable cross-sectional area is provided being in proportion to the movement of said floating piston means.

4. The cushioning device of claim 1, said further orifice means comprising:
   a cup-shaped orifice-defining member stationary within said first chamber section and subdividing the section;
   a valve member slidably received within said orifice-defining member;
   first compressed spring means interposed between said valve member and said floating piston means; and
   second compressed spring means interposed between the bottom of said orifice-defining member and said valve member, said orifice-defining member having a hole in the wall thereof to interconnect the interior space of said orifice-defining member and the space between said orifice-defining member and an end wall of the chamber, said valve member and said hole in cooperation providing an orifice of variable cross-sectional area being in proportion to the movement of said floating piston means.

5. The cushioning device of claim 4, said further orifice means further comprising:
   means defining a through bore in said orifice-defining member; and
   a check valve within said bore of said orifice-defining member to permit flow of liquid from the space between said floating piston means and said orifice-defining member, directly through said bore, and into the space between said orifice-defining member and an end wall of chamber, but not to permit flow of said liquid in an opposite direction therethrough.

* * * * *